(12) United States Patent
Susella

(10) Patent No.: US 12,206,778 B2
(45) Date of Patent: Jan. 21, 2025

(54) METHOD FOR PERFORMING CRYPTOGRAPHIC OPERATIONS IN A PROCESSING DEVICE, CORRESPONDING PROCESSING DEVICE AND COMPUTER PROGRAM PRODUCT

(71) Applicant: STMICROELECTRONICS S.r.l., Agrate Brianza (IT)

(72) Inventor: Ruggero Susella, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 135 days.

(21) Appl. No.: 17/857,633

(22) Filed: Jul. 5, 2022

(65) Prior Publication Data

US 2023/0017265 A1 Jan. 19, 2023

(30) Foreign Application Priority Data

Jul. 9, 2021 (IT) .................. 102021000018206

(51) Int. Cl.
*H04L 9/08* (2006.01)
(52) U.S. Cl.
CPC .................. *H04L 9/088* (2013.01)
(58) Field of Classification Search
CPC ........ H04L 9/088; H04L 9/0631; H04L 9/003
See application file for complete search history.

(56) References Cited

U.S. PATENT DOCUMENTS

| | | | |
|---|---|---|---|
| 6,215,876 B1 * | 4/2001 | Gilley | H04L 9/12 380/260 |
| 9,325,494 B2 * | 4/2016 | Boehl | H04L 9/003 |
| 2002/0165912 A1 * | 11/2002 | Wenocur | H04L 51/00 709/203 |
| 2015/0172043 A1 * | 6/2015 | Li | H04L 9/16 380/30 |
| 2015/0244530 A1 * | 8/2015 | Clayton | H04L 9/3242 713/189 |
| 2019/0245679 A1 * | 8/2019 | Suresh | G09C 1/00 |
| 2021/0021405 A1 | 1/2021 | Villegas et al. | |
| 2021/0091928 A1 * | 3/2021 | Dockser | H04L 9/0637 |

FOREIGN PATENT DOCUMENTS

JP 2005134478 A 5/2005

* cited by examiner

*Primary Examiner* — Abu S Sholeman
(74) *Attorney, Agent, or Firm* — Seed IP Law Group LLP

(57) ABSTRACT

One or more keys are derived from a master key by executing a plurality of encryption operations. A first encryption operation uses the master key to encrypt a plaintext input having a plurality of bytes. Multiple intermediate encryption operations are performed using a respective intermediate key generated by a previous encryption operation to encrypt respective plaintext inputs having a number of bytes. At least two bytes of a plaintext input have values based on a respective set of bits of a plurality of sets of bits of an initialization vector, wherein individual bits of the respective set of bits are introduced into respective individual bytes of the plaintext input and the respective set of bits has at least two bits and at most a number of bits equal to the number of bytes of the plaintext input.

24 Claims, 3 Drawing Sheets

|     $B_0$ | $B_1$ | $B_2$ | $B_3$ |
|---|---|---|---|
| 0 | 0 | 1 | 0 |
| 0 | 1 | 0 | 1 |
| 1 | 1 | 1 | 0 |
| 1 | 0 | 0 | 0 |
| $B_{12}$ | $B_{13}$ | $B_{14}$ | $B_{15}$ |

METHOD FOR PERFORMING CRYPTOGRAPHIC OPERATIONS IN A PROCESSING DEVICE, CORRESPONDING PROCESSING DEVICE AND COMPUTER PROGRAM PRODUCT

BACKGROUND

Technical Field

The present description relates to techniques for performing cryptographic operations in a processing device, comprising a Leakage resilient encryption procedure, which comprises a Leakage Resilient derivation function which derives a derived key from a master key.

Various embodiments may apply, e.g., to smartcard, microcontrollers, Internet of Things chips, set-top-box using an encryption or digital signature scheme. In particular embodiments can be applied in unprotected crypto hardware accelerators.

Description of the Related Art

Cryptographic protocols are abstract or concrete protocols that perform a security-related function and apply cryptographic methods, often as sequences of cryptographic primitives.

In the field of protection from Side Channel Attacks in devices which uses cryptographic algorithms, e.g., microcontroller implementing encryption algorithms, such as ECC or RSA, vertical Side Channel Attacks (SCA) are known, where the attacker can encrypt arbitrary data (input) using the device, in order to get the cryptographic key used by the encryption algorithm. The attackers record side channel information during encryption of known input data, the side channel being represented by power consumption, electromagnetic radiation, or other similar quantities.

The side channel is linked with the data processed by the device, which are the cryptographic key and the attacker's data fed as input, which represent therefore known data.

The attacker records many "traces" with different known input data and a constant unknown key, making hypotheses on the value of a portion of the cryptographic key, and uses statistical methods to verify such hypotheses using the traces. To apply such statistical methods the attacker needs to use many traces, each with different and known input data and constant key.

A known solution to defend from such attacks is to use an implementation with SCA protection, which however cannot make use of existing non protected hardware, while is often too late or too costly to embed protected hardware. Also it is not always possible to switch to protected software implementation, because of anti-reverse engineering constraints, as protected software must not be visible from attackers. Also protected software requires protection of the software, and generation of secret random numbers (secret even for legitimate user). Finally, there may be a significant downgrade of the performance.

On the other hand, it is possible to define an operation that is leakage resilient (DPA resistant) on top of existing hardware.

The basic requirement of Leakage Resilient encryption, in particular for public key encryption, is that an encryption key can be used for a very limited number of times. However, users may desire to have a master key which lasts a long time, for example, for years.

Therefore, in Leakage Resilient encryption schemes it is provided to derive a different key for each message from the same master key. This requires a Key Derivation Function, or KDF, which uses multiple times the master key. Thus, the KDF itself must be leakage resilient, e.g., a Leakage Resilient Key Derivation Function (LR-KDF).

Thus LR-KDF implemented on commonly available unprotected crypto hardware accelerators may represent an attractive solution if one cannot afford DPA protected solutions and/or wants to leverage existing hardware.

Solutions are known which makes use of a Leakage Resilient crypto such as the so called GGM scheme, described in Oded Goldreich, Shafi Goldwasser, and Silvio Micali. "*How to construct random functions*" Journal of the ACM, August 1986.

To this regard, in FIG. 1 it is shown a chain to obtain a derived key from a master key. A master key MK is supplied to an invocation of a cipher 11, e.g., a cipher performing AES (Advanced Encryption Standard) encryption, block 11 which receives the first bit $NC_0$ of an initialization vector NC. The initialization vector, which is sometimes also referred as nonce, has the property of uniqueness, which means that no initialization vector may be reused under the same key. The initialization vector NC may be randomly generated, although in variant embodiments an incremental generation using for instance a counter increasing monotonically may be used. The initialization vector NC can be seen as a plaintext to be encrypted by the AES 11. The intermediate encrypted key $IK_0$ of the encryption by the encryption block 11 is fed again to another invocation of the AES cipher 11 together with the following bit $NC_1$ of the initialization vector NC. The procedure is repeated till to the last n-th bit $NC_n$ of the initialization vector NC, which gives an encrypted output $IK_n$. Then a final encryption is performed on the n-th encrypted output $IK_n$ supplying a string of zeroes as plaintext instead of the initialization vector NC bits, to the invocation of AES cipher 11, obtaining finally as output the derived key DK.

This procedure has the limitation of performing one encryption per initialization vector bit plus one, resulting for instance in 129 encryptions for an initialization vector of 128 bits.

From the publication of Medwed, Standaert, Joux, "*Towards Super-Exponential Side-Channel Security with Efficient Leakage-Resilient PRFs,*" In: Prouff, E., Schaumont, P. (eds.) Cryptographic Hardware and Embedded Systems—CHES 2012—14th International Workshop, Leuven, Belgium, Sep. 9-12, 2012. Proceedings. Lecture Notes in Computer Science, vol. 7428, pp. 193-212. Springer (2012), it is known a method which is faster than GGM, called LR-PRF (Leakage Resilient Pseudo Random Function). Such method puts up to 8 initialization vector bits in each input byte of the status. Such method provides that the number of initialization vector bits in each input byte can be configured between 1 and 8. If the number n of initialization vector bits in each input byte is 1, this corresponds to the GGM method, where two inputs are used with the master key. If the number n of initialization vector bits in each input byte is 8 there are 256 inputs used with the same key.

Since an encryption such AES is typically attacked through the first round SBOX, in this LR-PRF solution the SBOX works independently on bytes. Also, such LR-PRF solution computes all bytes in parallel, so that it maximizes the noise. In this way even if an attacker would be able to recover all key bytes, the attacker would not know their origin and would have to test $16!=2^{44}$ keys.

The LR-PRF algorithm requires a number of encryption operations equal to the initialization vector size divided by the number n of initialization vector bits in each input byte plus one of initialization vector_size/n+1 encryption. Thus, for n=1 there are 129 encryption operation to be performed, for n=8 only 17.

Such a solution presents however drawbacks since:
it considers only attacks on the first round SBOX;
it requires parallel computation of all SBOXs;
it ignores extremely localized electromagnetic side channels.

BRIEF SUMMARY

In an embodiment, a method comprises: executing cryptographic operations on input data using cryptographic circuitry; and protecting, using the cryptographic circuitry, the cryptographic operations during the executing. The protecting includes iteratively executing a plurality of encryption operations to generate at least one derived key from a master key and an initialization vector having a plurality of sets of bits. The plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input.

In an embodiment, a device comprises memory and cryptographic circuitry coupled to the memory. The cryptographic circuitry, in operation, executes cryptographic operations on input data and protects the cryptographic operations during the executing. The protecting includes iteratively executing a plurality of encryption operations to generate at least one derived key from a master key and an initialization vector having a plurality of sets of bits. The plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input.

In an embodiment, a system comprises an application processor and cryptographic circuitry coupled to the application processor. The cryptographic circuitry, in operation, executes cryptographic operations on input data and protects the cryptographic operations during the executing. The protecting including iteratively executing a plurality of encryption operations to generate at least one derived key from a master key and an initialization vector having a plurality of sets of bits. The plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input.

In an embodiment, a non-transitory computer-readable medium has contents which configure cryptographic circuitry to perform a method. The method comprises: executing cryptographic operations on input data; and protecting the cryptographic operations during the executing, the protecting including iteratively executing a plurality of encryption operations to generate at least one derived key from a master key and an initialization vector having a plurality of sets of bits, wherein the plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input.

BRIEF DESCRIPTION OF THE SEVERAL VIEWS OF THE DRAWINGS

The disclosure will now be described purely by way of a non-limiting example with reference to the annexed drawings, in which:

FIG. 2 represents an input of the cipher according to the method here described;

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment," that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

In FIG. 2 it is shown a State S which represents the input data structure of a round of the AES cipher 11. As known, a plaintext of 128 bits is copied in the State S, dividing it in sixteen 8-bit bytes, in a 4×4 array, on which the operations of the AES rounds, starting with SubstituteBytes, are performed.

As shown in FIG. 2, according to the method here described, in the 16 bytes, $B_0 \ldots B_{15}$ of the State S input of the cipher 11 is introduced a number nn of initialization vector bits NC. The number nn of initialization vector bits NC may be different according to the different embodiments, in particular may vary between 2 and 16. Thus, up to one initialization vector bit for input byte is provided, a maximum of one initialization vector bit in each input byte of the State S, the latter happening when nn=16.

Figure 1:
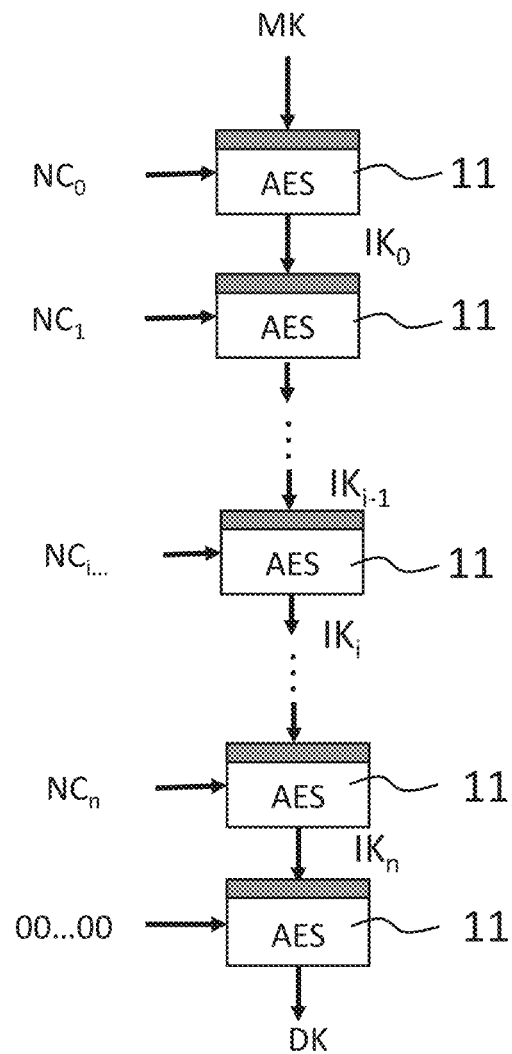
FIG. 1 was discussed in the foregoing.
Figure 3:
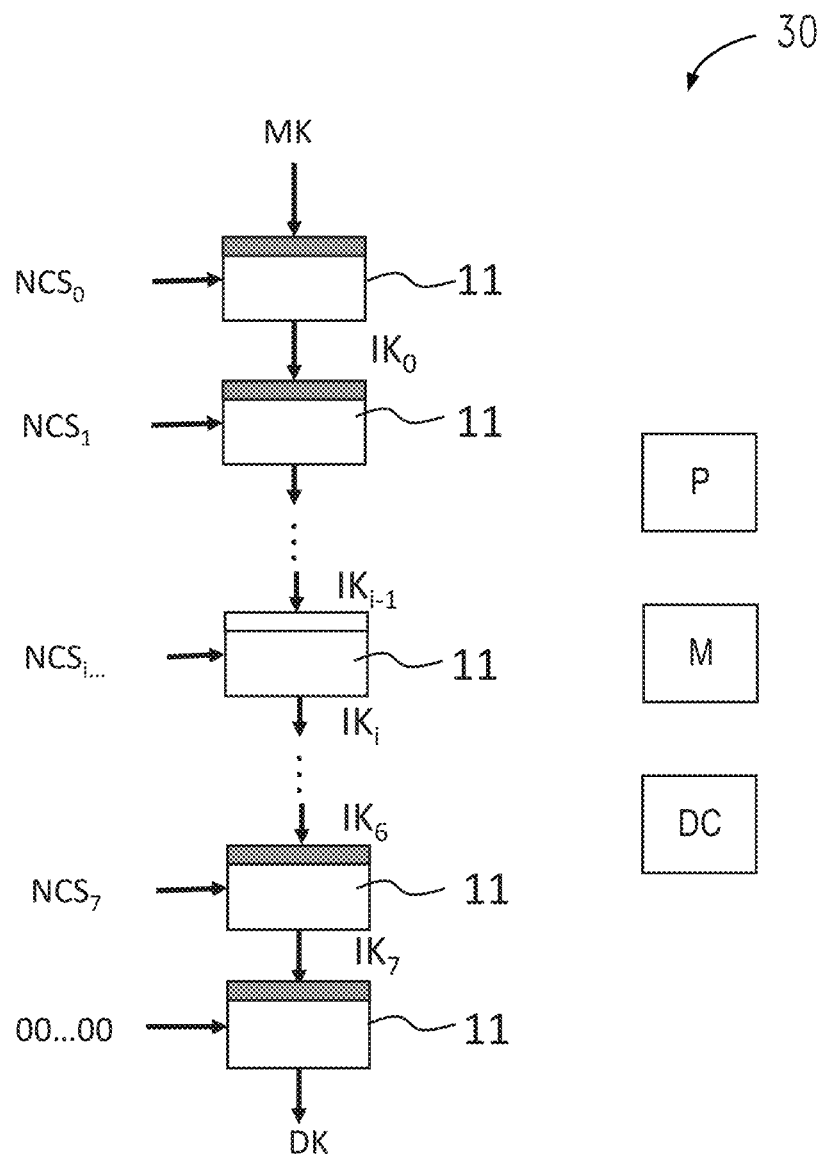
FIG. 3 represents a flow diagram of an embodiment of the method here described.

Thus, by way of example, given an initialization vector NC of 128 bit of length, which can be seen as by a plurality of consecutive sets of bits $NCS_0 \ldots NCS_7$, in the example shown starting from the MSB to the LSB, as shown in FIG. 3, where the number nn of initialization vector bits is set to 16, bits with logical values 0 or 1 are introduced in respective 16 bytes $B_0 \ldots B_{15}$ of a 16 bytes input state S for the SBOX of the first round of an AES.

In general, the number nn of initialization vector bits is greater than one.

Thus the method, as shown in FIG. 3, includes a key derivation procedure which includes:

invoking a plurality of instances of an encryption cipher 11, for example, at each iteration an instance or invocation of AES cipher is invoked, providing a unique initialization vector NC, in particular a random number, comprising a plurality of initialization vector bits, in the example 128 bits, invoking a first instance of the cipher 11, providing to said first instance of said cipher 11, the master key MK as encryption key and a first set of bits $NCS_0$ in such plurality of initialization vector bits, of which the initialization vector NC is composed, as plaintext input which is encoded by the cipher 11 with such master key MK obtaining an intermediate key, $IK_0$, then performing an iterative procedure comprising at each iteration, invoking a further instance of said cipher 11, e.g., the $(i-1)^{th}$ invocation or instance of the cipher 11, I being the index of the iterations, providing an intermediate key $IK_{i-1}$ at the encrypted output of the previous instance of the cipher 11, previous with respect to said further instance, and a set $NCS_i$ of the plurality of initialization vector bits as plaintext input, which is subsequent the set $NCS_{i-1}$ used by the previous instance of the cipher 11, such subsequent set $NCS_i$ being encoded by such further, $i^{th}$, instance of the cipher 11 with the previous intermediate key, $IK_{i-1}$, to obtain a subsequent intermediate key $IK_i$, the iteration being performed on all the sets NCSi of the plaintext, e.g., from $NCS_0$ to $NCS_7$ in the example with nn=16, wherein providing a set $NCS_i$ of the plurality of initialization vector bits as plaintext input, in the first operation and following iterations, includes introducing the initialization vector bits in bytes of an input state (S) of the cipher 11, introducing at most one initialization vector bit per byte, a number nn of bits introduced in said input state S varying from 2, 1 initialization vector bit every 8 bytes of input state S, to the number of bytes in the input state of the cipher 11.

In particular the input state S has 16 bytes, e.g., in the AES case, and said number nn of bits introduced in said input state S thus varies from 2 to 16, in which case, nn=16, an initialization vector bit in each byte of the input state (S) is provided.

Then, also in this case a final encryption is performed on the last encrypted output, the last output encrypting a set of bits NCS, specifically $NCS_7$, which in the example is the eighth intermediate key $IK_7$, supplying a string of zeroes as plaintext instead of the initialization vector NC bits, to the invocation of AES cipher 11, obtaining finally as output the derived key DK.

It is pointed out that for a number nn of initialization vector bits per input state S greater than 8, the number of AES encryption is lower than any prior art method, as shown in Table 1 below, where number of AES encryption as a function of number nn of initialization vector bits per each input byte is shown.

TABLE 1

| | nn = 9 | nn = 10 | nn = 11 | nn = 12 | nn = 13 | nn = 14 | nn = 15 | nn = 16 |
|---|---|---|---|---|---|---|---|---|
| AES encryptions | 16 | 14 | 13 | 12 | 11 | 11 | 10 | 9 |

If the number nn of initialization vector bits in the input status S is 16, one per input byte, there are 65k inputs used with the same key.

But, as AES is typically attacked through the first round SBOX, which works independently on bytes and are provide to each SBOX only 2 possible inputs (0 or 1), this attack path becomes infeasible, furthermore this method does not require parallel computation of all SBOXes, although it may still help to have it for increased noise.

The method described also could be effective against extremely localized EM side channels.

The method of FIG. 3 may be implemented using a system 30, which as illustrated, includes one or more processors P (e.g., cryptographic processors, application processors, etc.), one or more memories M, and discrete circuitry DC, which may be employed in various combinations to implement the functionality of the system 30. Such functionality may include all or part of the encrypting and protection operations described herein, as well as other functional operations of the system 30, such as operations associated with smartcards, microcontrollers, Internet of Things chips, set-top-boxes, applications, etc., using an encryption or digital signature scheme.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

It is noted that the cipher here described is an AES cipher, nevertheless other types of cipher, can be used.

The method for performing cryptographic operations in a processing device here described can be used in operations including a Leakage Resilient derivation function which derives a different key for each message from the same master key in order to perform a Leakage resilient encryption procedure. However the method for performing cryptographic operations in a processing device here described can be used in other cryptographic operations which require Leakage Resilient derivation function which derives a key from a master key, for instance in an authentication procedure.

According to an embodiment of the solution described herein, the method for cryptographic operation of data in a processing device includes a Leakage resilient encryption procedure, which comprises a Leakage Resilient derivation function which derives at least a key from a master key, said method comprising performing said operation of deriving at least a key from a master key by:
providing a plurality of instances of an encryption cipher,
providing a unique initialization vector, in particular a random number, comprising a plurality of initialization vector bits, in particular 128,
invoking a first instance of said cipher providing to said first instance of said cipher a master key as encryption key and a first set of bits in said plurality of initialization vector bits as plaintext input which is encoded by said cipher with said master key obtaining an intermediate key,
performing an iterative procedure comprising at each iteration,
invoking a further instance of said cipher, providing an intermediate key at the encrypted output of an instance of the cipher, previous with respect to said further instance, and a set of said plurality of initialization vector bits as plaintext input, which is subsequent the set used by the previous instance of the cipher, said subsequent set being encoded by said further instance of the cipher with said previous intermediate key to obtain a subsequent intermediate key,
said iteration being performed on all the sets of the plaintext,
wherein said providing set of said plurality of initialization vector bits as plaintext input includes providing introducing said initialization vector bits in bytes of an input state of the cipher, introducing at most one initialization vector bit per byte, a number of bits introduced in said input state varying from 2 to the number of bytes in the input state of the cipher.

In various embodiments, said input state has 16 bytes and said number of bits introduced in said input state varies from 2 to the 16, in which case an initialization vector bit in each byte of the input state is provided.

In various embodiments, a final encryption is performed on the last encrypted output supplying a string of zeroes as plaintext to the instance of cipher, obtaining as output the derived key.

In various embodiments, said cipher is an AES cipher.

In an embodiment, said Leakage Resilient derivation function is comprised in a Leakage resilient encryption procedure and derives a different key for each message from the same master key.

The solution here described refers also to embodiments of a processing device configured to perform the steps of the method of any of the previous embodiments.

The solution here described refers also to a computer program product that can be loaded into the memory of at least one computer and comprises parts of software code that are able to execute the steps of the method of any of the previous embodiments when the product is run on at least one computer.

In an embodiment, a method comprises: executing cryptographic operations on input data using cryptographic circuitry; and protecting, using the cryptographic circuitry, the cryptographic operations during the executing. The protecting includes iteratively executing a plurality of encryption operations to generate at least one derived key from a master key and an initialization vector having a plurality of sets of bits. The plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input. In an embodiment, the plaintext inputs each have 16 bytes and the number of bits of a set of bits has a range of 2 to 16. In an embodiment, the number of bytes is 16, the number of bits of each set of bits of the initialization vector is 16, and each byte of each plaintext input includes a single bit of the initialization vector. In an embodiment, the plurality of encryption operations includes an additional encryption operation, which, using an intermediate key generated in a last of the multiple intermediate encryption operations, encrypts a plaintext input of a string of zeros, generating a derived key of the at least one derived key. In an embodiment, the plurality of encryption operations are AES encryption operations. In an embodiment, the protecting includes performing a Leakage Resilient derivation function which derives a different key for each message of a plurality of messages from the master key; and the method comprises executing Leakage resilient encryption operations on the plurality of messages using the keys derived for the messages. In an embodiment, the method comprises generating a plurality of derived keys from the master key in parallel. In an embodiment, bytes of the plaintext inputs having values based on a bit of the initialization vector have a value of zero or a value of one depending on a value of the bit; and other bytes of the plaintext inputs have a value of zero.

In an embodiment, a device comprises: memory; and cryptographic circuitry coupled to the memory, wherein the cryptographic circuitry, in operation executes cryptographic operations on input data and protects the cryptographic operations during the executing, the protecting including iteratively executing a plurality of encryption operations to generate at least one derived key from a master key and an initialization vector having a plurality of sets of bits, wherein the plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input. In an embodiment, the plaintext inputs each have 16 bytes and the number of bits of a set of bits has a range of 2 to 16. In an embodiment, the number of bytes is 16, the number of bits of each set of bits of the initialization vector is 16, and each byte of each plaintext input includes a single bit of the initialization vector. In an embodiment, the plurality of encryption operations includes an additional encryption operation, which, using an intermediate key generated in a last of the multiple intermediate encryption operations, encrypts a plaintext input of a string of zeros, generating a derived key of the at least one derived key. In an embodiment, the plurality of encryption operations are AES encryption operations. In an embodiment, the protecting includes performing a Leakage Resilient derivation function which derives a different key for each message of a plurality of messages from the master key; and the method comprises executing Leakage resilient encryption operations on the plurality of messages using the keys derived for the messages. In an embodiment, the cryptographic circuitry, in operation, generates a plurality of derived keys from the master key in parallel. In an embodiment: bytes of the plaintext inputs having values based on a bit of the initialization vector have a value of zero or a value of one depending on a value of the bit; and other bytes of the plaintext inputs have a value of zero.

In an embodiment, a system comprises: an application processor; and cryptographic circuitry coupled to the application processor, wherein the cryptographic circuitry, in operation executes cryptographic operations on input data and protects the cryptographic operations during the executing, the protecting including iteratively executing a plurality of encryption operations to generate at least one derived key from a master key and an initialization vector having a plurality of sets of bits, wherein the plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input. In an embodiment, the plaintext inputs each have 16 bytes and the number of bits of a set of bits has a range of 2 to 16. In an embodiment, the plurality of encryption operations includes an additional encryption operation, which, using an intermediate key generated in a last of the multiple intermediate encryption operations, encrypts a plaintext input of a string of zeros, generating a derived key of the at least one derived key.

In an embodiment, a non-transitory computer-readable medium has contents which configure cryptographic circuitry to perform a method. The method comprises: executing cryptographic operations on input data; and protecting the cryptographic operations during the executing, the protecting including iteratively executing a plurality of encryption operations to generate at least one derived key from a master key and an initialization vector having a plurality of sets of bits, wherein the plurality of encryption operations include: a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits are introduced into respective individual bytes of the input bytes and the set of bits has at least two bits and at most a number of bits equal to a number of bytes of the plaintext input; and multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits are introduced into respective individual bytes of the respective plaintext input and the respective set of bits has at least two bits and at most a number of bits equal to the number of bytes of the respective plaintext input. In an embodiment, the plurality of encryption operations includes an additional encryption operation, which, using an intermediate key generated in a last of the multiple intermediate encryption operations, encrypts a plaintext input of a string of zeros, generating a derived key of the at least one derived key. In an embodiment, the contents comprise instructions executed by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing cryptographic operations on input data using cryptographic circuitry; and
protecting, using the cryptographic circuitry, the cryptographic operations during the executing, the protecting including iteratively executing a plurality of encryption operations to generate at least one derived key from a master key and an initialization vector having a plurality of sets of bits, wherein the plurality of encryption operations include:
a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits of the plurality of sets of bits of the initialization vector are introduced into respective individual bytes of the input bytes and the set of bits of the plurality of sets of bits of the initialization vector has at least two bits and at most a number of bits equal to a number of bytes of the plaintext input; and
multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits of the plurality of sets of bits of the initialization vector are introduced into respective individual bytes of the respective plaintext input and the respective set of bits of the plurality of sets of bits of the initialization vector has at least two bits and at most a number of bits equal to the number of bytes of the respective plaintext input.

2. The method according to claim 1, wherein the plaintext inputs each have 16 bytes and the number of bits of a set of bits of the plurality of sets of bits of the initialization vector has a range of 2 to 16.

3. The method of claim 1, wherein the number of bytes is 16, the number of bits of each set of bits of the initialization vector is 16, and each byte of each plaintext input includes a single bit of the initialization vector.

4. The method of claim 1, wherein the plurality of encryption operations includes an additional encryption operation, which, using an intermediate key generated in a last of the multiple intermediate encryption operations, encrypts a plaintext input of a string of zeros, generating a derived key of the at least one derived key.

5. The method according to claim 1, wherein the plurality of encryption operations are AES encryption operations.

6. The method according to claim 1, wherein:
the protecting includes performing a Leakage Resilient derivation function which derives a different key for each message of a plurality of messages from the master key; and
the method comprises executing Leakage resilient encryption operations on the plurality of messages using the keys derived for the messages.

7. The method of claim 6, comprising generating a plurality of derived keys from the master key in parallel.

8. The method of claim 1, comprising generating a plurality of derived keys from the master key in parallel.

9. The method of claim 1, wherein:
bytes of the plaintext inputs having values based on a bit of the initialization vector have a value of zero or a value of one depending on a value of the bit; and
other bytes of the plaintext inputs have a value of zero.

10. A device, comprising:
memory; and
cryptographic circuitry coupled to the memory, wherein the cryptographic circuitry, in operation, executes cryptographic operations on input data and protects the cryptographic operations during the executing, the protecting including iteratively executing a plurality of encryption operations to generate at least one derived key from a master key and an initialization vector having a plurality of sets of bits, wherein the plurality of encryption operations include:
a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits of the plurality of sets of bits of the initialization vector are introduced into respective individual bytes of the input bytes and the set of bits of the plurality of sets of bits of the initialization vector has at least two bits and at most a number of bits equal to a number of bytes of the plaintext input; and
multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits of the plurality of sets of bits of the initialization vector are introduced into respective individual bytes of the respective plaintext input and the respective set of bits of the plurality of sets of bits of the initialization vector has at least two bits and at most a number of bits equal to the number of bytes of the respective plaintext input.

11. The device according to claim 10, wherein the plaintext inputs each have 16 bytes and the number of bits of a set of bits of the plurality of sets of bits of the initialization vector has a range of 2 to 16.

12. The device of claim 10, wherein the number of bytes is 16, the number of bits of each set of bits of the initialization vector is 16, and each byte of each plaintext input includes a single bit of the initialization vector.

13. The device of claim 10, wherein the plurality of encryption operations includes an additional encryption operation, which, using an intermediate key generated in a last of the multiple intermediate encryption operations, encrypts a plaintext input of a string of zeros, generating a derived key of the at least one derived key.

14. The device according to claim 10, wherein the plurality of encryption operations are AES encryption operations.

15. The device according to claim 10, wherein:
the protecting includes performing a Leakage Resilient derivation function which derives a different key for each message of a plurality of messages from the master key; and
the method comprises executing Leakage resilient encryption operations on the plurality of messages using the keys derived for the messages.

16. The device of claim 15, wherein the cryptographic circuitry, in operation, generates a plurality of derived keys from the master key in parallel.

17. The device of claim 10, wherein the cryptographic circuitry, in operation, generates a plurality of derived keys from the master key in parallel.

18. The device of claim 10, wherein:
bytes of the plaintext inputs having values based on a bit of the initialization vector have a value of zero or a value of one depending on a value of the bit; and
other bytes of the plaintext inputs have a value of zero.

19. A system, comprising:
an application processor; and
cryptographic circuitry coupled to the application processor, wherein the cryptographic circuitry, in operation, executes cryptographic operations on input data and protects the cryptographic operations during the executing, the protecting including iteratively executing a plurality of encryption operations to generate at least one derived key from a master key and an initialization vector having a plurality of sets of bits, wherein the plurality of encryption operations include:
a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits of the plurality of sets of bits of the initialization vector are introduced into respective individual bytes of the input bytes and the set of bits of the plurality of sets of bits of the initialization vector has at least two bits and at most a number of bits equal to a number of bytes of the plaintext input; and
multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits of the plurality of sets of bits of the initialization vector are introduced into respective individual bytes of the respective plaintext input and the respective set of bits of the plurality of sets of bits of the initialization vector has at least two bits and at most a number of bits equal to the number of bytes of the respective plaintext input.

20. The system according to claim 19, wherein the plaintext inputs each have 16 bytes and the number of bits of a set of bits of the plurality of sets of bits of the initialization vector has a range of 2 to 16.

21. The system of claim 19, wherein the plurality of encryption operations includes an additional encryption operation, which, using an intermediate key generated in a last of the multiple intermediate encryption operations, encrypts a plaintext input of a string of zeros, generating a derived key of the at least one derived key.

22. A non-transitory computer-readable medium having contents which configure cryptographic circuitry to perform a method, the method comprising:
executing cryptographic operations on input data; and protecting the cryptographic operations during the executing, the protecting including iteratively executing a plurality of encryption operations to generate at least one derived key from a master key and an initialization vector having a plurality of sets of bits, wherein the plurality of encryption operations include:
- a first encryption operation which, using the master key, encrypts a plaintext input having a plurality of bytes, generating a first intermediate key, at least two bytes of the plaintext input having values based on a set of bits of the plurality of sets of bits of the initialization vector, wherein individual bits of the set of bits of the plurality of sets of bits of the initialization vector are introduced into respective individual bytes of the input bytes and the set of bits of the plurality of sets of bits of the initialization vector has at least two bits and at most a number of bits equal to a number of bytes of the plaintext input; and
- multiple intermediate encryption operations, wherein an encryption operation of the multiple intermediate encryption operations, using a respective intermediate key generated by a previous encryption operation of the plurality of encryption operations, encrypts a respective plaintext input having a number of bytes, generating a respective additional intermediate key, at least two bytes of the respective plaintext input having values based on a respective set of bits of the plurality of sets of bits of the initialization vector, wherein individual bits of the respective set of bits of the plurality of sets of bits of the initialization vector are introduced into respective individual bytes of the respective plaintext input and the respective set of bits of the plurality of sets of bits of the initialization vector has at least two bits and at most a number of bits equal to the number of bytes of the respective plaintext input.

23. The non-transitory computer-readable medium according to claim 22,
wherein the plurality of encryption operations includes an additional encryption operation, which, using an intermediate key generated in a last of the multiple intermediate encryption operations, encrypts a plaintext input of a string of zeros, generating a derived key of the at least one derived key.

24. The non-transitory computer-readable medium of claim 22, wherein the contents comprise instructions executed by the cryptographic circuitry.

\* \* \* \* \*